United States Patent [19]
Gold et al.

[11] Patent Number: 5,087,407
[45] Date of Patent: Feb. 11, 1992

[54] METHOD TO DETERMINE ACTINIDE POLLUTION IN WATER

[76] Inventors: Raymond Gold, 1982 Greenbrook Blvd.; James H. Roberts, 2002 Howell Ave.; Christopher C. Preston, 1881 Alder Ave., all of Richland, Wash. 99352

[21] Appl. No.: 395,050
[22] Filed: Aug. 17, 1989
[51] Int. Cl.$^5$ .................................... G01N 23/222
[52] U.S. Cl. .............................. 376/159; 250/390.04
[58] Field of Search ................... 250/390.03, 390.04, 250/472.1; 376/154, 159, 253

[56] References Cited

U.S. PATENT DOCUMENTS

| | | | |
|---|---|---|---|
| 3,569,703 | 2/1971 | Alter | 250/472.1 |
| 3,665,194 | 5/1972 | Alter et al. | 250/472.1 |
| 4,518,860 | 5/1985 | Alter et al. | 250/472.1 |

FOREIGN PATENT DOCUMENTS 424039 9/1974 U.S.S.R. ........................ 376/159

OTHER PUBLICATIONS

Rago et al., "A Sensitive Fast Neutron Monitor Using Fission-Foil LEXAN Detectors", Health Physics, Jan. 1974, pp. 102-104.
Chaudhuri et al., "Application of Fission Track Registration Technique in the Estimation of Fissile Materials, Analysis of Plutonium in Solutions of Complex Matrices", Journal of Radioanalyitcal Chemistry, vol. 33, No. 1, 1976, pp. 53-65.
Liu et al., "The Application of Fission Track Detectors as Reactor Neutron Temperature Monitor", International Journal of Applied Radiation and Isotopes, vol. 22, pp. 227-232.
R. H. Iyer, M. L. Sagu, R. Sampathkumar, N. K. Chaudhuri, Nucl. Instr. Methods, 109 (1973) 453.
R. H. Iyer, R. Sampathkumar, N. K. Chaudhuri, Nucl. Instr. Methods, 115 (1974) 23.
R. P. Larsen and R. D. Oldham, "Development of a Method for the Determination of Fallout Plutonium in Tissue", Radiological and Environmental Research Division Annual Report, Jul. 1973-Jun. 1974, ANL-75-3, Part II.
R. P. Larsen and R. D. Oldham, "Anion Exchange Separation of Plutonium in Hydrochloric—Hydrobromic Acid Media", Radiological Research Division Annual Report, Jul. 1973-Jun. 1974, ANL-75-3, Part II.
R. P. Larsen and R. D. Oldham, "Progress Report on the Development of the Fission Track Method for the Determination of Plutonium in Biological Materials", Radiological and Environmental Research Division Annual Report, Jul. 1974-Jun. 1975, ANL-75-60, Part II, Jul. 1975-Jun. 1976, ANL-75-88, Part II.
R. Gold, R. J. Armani and J. H. Roberts, "Absolute Fission Rate Measurements with Solid State Track Recorders", Nucli. Sci. Eng. 34, 13-34 (1968).
Consideration in Measuring Trace Radionuclides in Soil Samples by L X-Ray Detection; Nuclear Science Symposium, Oct. 19-21, 1977, San Francisco, Calif., M. G. Strauss, I. S. Sherman, E. J. Swanson and R. H. Pehl, (published in IEEE Trans. Nucl. Sci. Ns-25, No. 1, Feb. 1978).

Primary Examiner—Stephen C. Bentley
Attorney, Agent, or Firm—Keith S. Bergman

[57] ABSTRACT

Apparatus and a method using solid state track recorder (SSTR) metrology are disclosed to accurately measure small amounts of actinide pollution in water. A relatively small sample cell contains a fluidic sample and carries a SSTR. Sample cell configuration allows use of the fluidic sample itself as an asymptotic fission source for the SSTR and allows simultaneous irradiation of a plurality of such sample cells in existing thermal neutron irradiators. The metrology process comprises 1) obtaining a plurality of fluidic samples to be tested in sample cells containing SSTRs, 2) irradiating the sample cells uniformly with a neutron fluence of selected energy for a predetermined time, 3) determining base line actinide concentration from observed track density radiation activity in the SSTRs by calculation, by inclusion of a standard solid actinide deposit on an SSTR in an irradiated batch, or by inclusion of standard fluidic samples of known actinide concentration in an irradiated sample batch, and 4) determining the actinide concentration above the base line concentration in the tested samples by analyzing the SSTRs in each sample cell by known track counting and computational methods.

7 Claims, 1 Drawing Sheet

U.S. Patent  Feb. 11, 1992  5,087,407
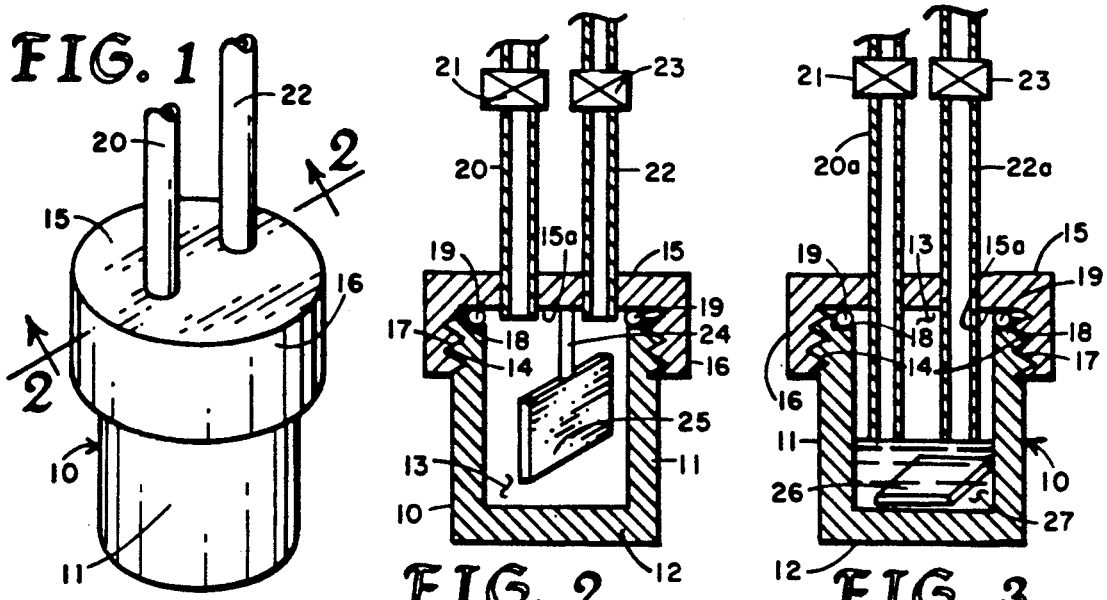
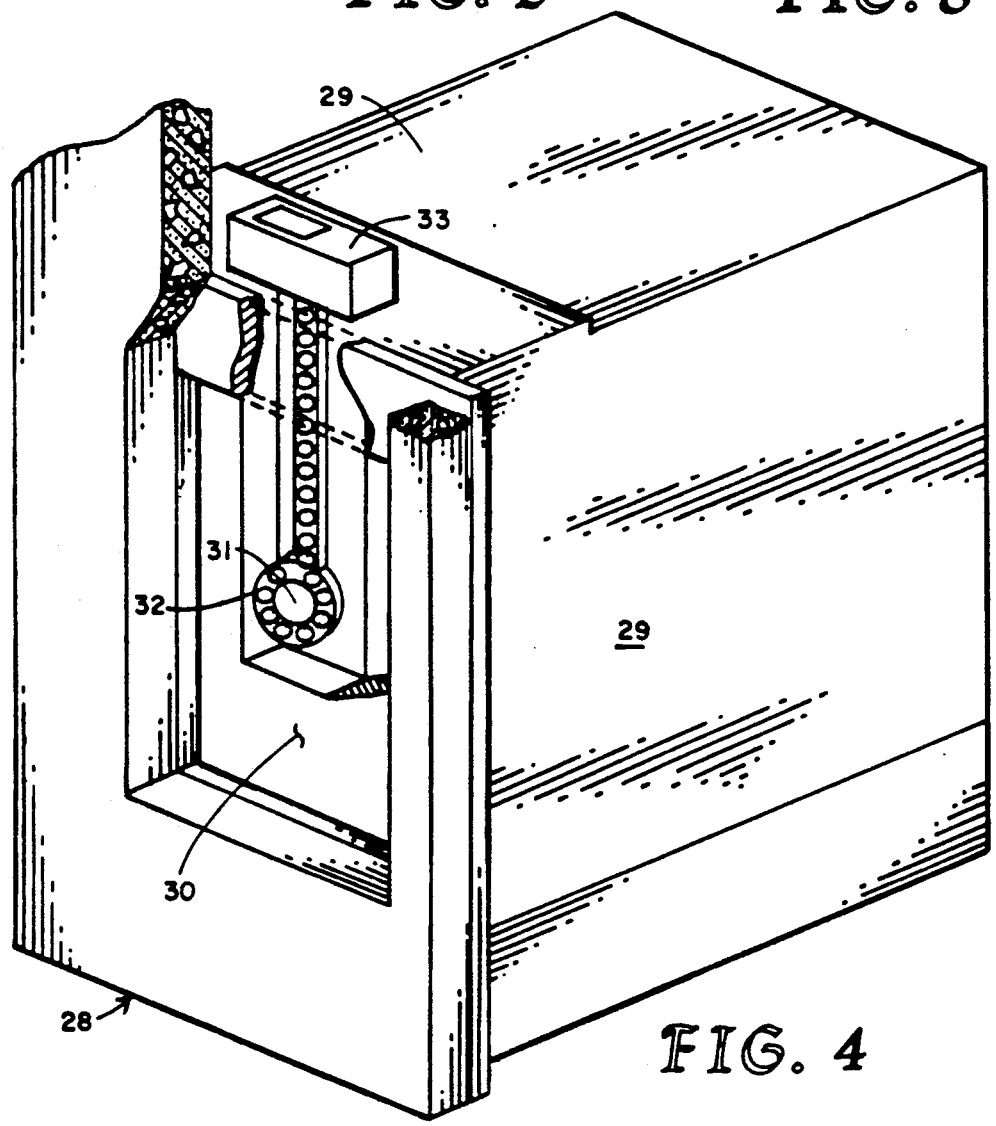

METHOD TO DETERMINE ACTINIDE POLLUTION IN WATER

RELATED APPLICATIONS

There are no applications for patent related hereto heretofore filed in this or any foreign country.

BACKGROUND OF INVENTION

1. Field of Invention

The instant invention relates generally to the accurate determination of relatively low actinide pollution in water by solid state track recorder (SSTR) metrology, and more particularly to such determination carried out in small individual sample cells wherein a fluidic sample constitutes an asymptotic fission source for a contained SSTR.

2. Background and Description of Prior Art

Hazards created by the leaching of actinides into water have been an ever-present problem in the nuclear energy field since its inception. Principal concerns involve such leaching into the ground water of the ecosystem to cause long-lived pollution, and the leaching of such elements into the fluidic systems of light and heavy water reactors from fuel elements. Various monitoring systems to detect such intrusions have heretofore become known, but in general the known methods have been complex, costly, time-consuming in use, and generally have not provided adequate sensation of relatively small amounts of actinide contamination within sufficiently short time periods to meaningfully predict such contamination. Our invention seeks to provide both apparatus and a process to overcome these problems.

The chief mechanism for pollution of the ecosystem by man generated nuclear activities is by dispersement from areas of radioactive concentration, principally from present day waste disposal sites. Pollutants of primary concern are the long-lived actinide elements which represent the most significant hazards, and their chief dispersal mechanism is commonly groundwater about the nuclear concentration sites. The two primary fissile nuclides that exist in all sites, whether power reactor plants, fuel fabrication facilities, fuel reprocessing plants, or spent fuel storage areas, are U-235 and Pu-239. Measurement of concentrations of these isotopes in ground water may be used to determine contamination release generally both quantitatively and qualitatively, and has become a standard for so doing.

Similarly in light or heavy water reactors, fuel elements may leak because of imperfections in manufacture, radiation induced damage, corrosion, or the like. It is crucial in such structures that leaking fuel elements be identified and replaced as soon as possible, prior to any release of radioactivity and fuel into the water moderator of a reactor. This determination may be approached in the same fashion as environmental pollution.

In any assay method for making the required determinations of contaminant concentrations, there must be high sensitivity to provide appropriate early warning of any actinide release and thereby afford necessary time to identify and resolve the specific problem causing the release. Since time is a crucial factor in addressing and resolving such release problems, the method of highest sensitivity gives the earliest possible warning and hence, the greatest possible protection. The instant invention discloses a process of high sensitivity for measurement of U-235 and Pu-239 contamination in water by using a fission track method for making such determination, with significantly higher sensitivity than known conventional nuclear metrology methods.

Our metrology method uses fission track measurements in solid state track recorders (SSTRs) to assay uranium and plutonium in ground water by reason of the fissionability of those elements. The use of SSTRs to determine radioactive mass is well known and such devices in their essence have heretofore been used to determine actinide contamination in biological water samples, especially by R. P. Larsen and R. D. Oldham, as evidenced in various of their writings and publications known in the nuclear literature. The methods disclosed by Larsen and Oldham, however, are both complex and costly. They involve essentially the extraction of plutonium from biological materials by chemical separation and after separation, electro-deposition of the material to create a plutonium fission deposit which is then placed adjacent a SSTR of the traditional type and irradiated in a known thermal neutron flux for a known period of time. Larsen and Oldham use a polycarbonate polymer type SSTR (Lexan) with typical thermal neutron flux of $2 * 10^{13}$ neutron/cm$^2$/sec for a twenty-four hour exposure duration. The plutonium present in the sample is then determined from the observed fission track density, the measured thermal neutron flux, the known thermal neutron fission cross-section of plutonium and the measured efficiencies for a) extraction of plutonium from the chemical separation process, b) plate out of the plutonium in the electro-disposition process, and c) fission track counting in the Lexan SSTR.

Throughout this process, great care must be exercised to prevent contamination by naturally occurring actinides which are ubiquitous at the levels of concentration of interest. Contaminations from natural actinides in apparatus, material, reagents and laboratory environments are sufficient to totally compromise the measurements involved and constitute the controlling factor in determining applicability of the Larsen and Oldham process.

Our invention provides a sampling process to determine actinide pollution in water that uses SSTR assaying methods, but applies those methods in quite a different fashion and with different apparatus to distinguish it from this known prior art.

Our invention firstly provides a simple, inexpensive quantitative early warning process to determine whether actinide pollution has occurred, rather than a more complex and costly qualitative process to determine various parameters of any such pollution. Only after determination that actinide pollution exists is there justification to make the expenditures and expend the efforts required to determine isotopic composition of the pollution using the Larsen and Oldham method or some similar process. Our process is of high sensitivity to allow determination of actinide pollution in water well below maximum permissible concentrations (MPC) as presently set by regulatory bodies. This sensitivity is necessarily required for our invention to fulfill its purposes to provide sufficiently advanced warning to allow time to implement more costly and complex separation-type assay methods and to allow correction of the causes of the problem in the first instance.

Our process allows the use of relatively small sample cells of particular configuration that do not require removal of or external contact with a sample throughout the entire metrology process, after placement of a sample within the sample cell. This provides multiple benefits over known processes in that no actinide contamination is introduced by intermediate stages of processing and that substantial numbers of the smaller sample cells may be simultaneously irradiated in the same thermal neutron fluence. The lowering of potential for sample contamination by naturally occurring actinides is quite material in our process to provide the accuracy and sensitivity that it attains. Similarly, simultaneous processing of a plurality of samples materially effects our process by substantially reducing the time period required to irradiate a given number of samples and reduce the cost of so doing. This benefit becomes more important when considered in connection with the limited radiation volumes existing in reactors. Additionally, the small size of our sample cell lowers any potential radioactivity produced by neutron irradiation of the sample cell and thusly lowers any personnel exposure that might arise in post-irradiation handling of the cells.

Additionally, our sample cell creates an asymptomatic SSTR detection configuration with liquid, that is, the water sample itself serves as the asymptotic detection medium. In an asymptotic SSTR detection configuration, the source of fission fragments, which commonly in the past has been a solid fission deposit, is thicker than the range of fission fragments in the source. Consequently, increasing the source thickness will no longer increase the observed fission track density, with other parameters constant, so that the SSTR sensitivity attains a maximum or limiting value called its asymptotic sensitivity. In this configuration, the fission fragment source is infinitely thick, insofar as the SSTR detector is concerned. Asymptotic SSTR detector configurations have heretofore become known, with metallic foils furnishing the asymptotic media, for neutron dosimetry and measurement of spontaneous fission half lives, and various asymptotic values have been deduced for fissile elements, especially metallic uranium and uranium oxide foil. The concept of a liquid as a source medium for an asymptotic SSTR detection configuration, however, has not previously been known nor has this procedure been applied to water samples in environmental site surveys for measurement of actinide content.

The sensitivities that can be attained using an asymptotic SSTR configuration, wherein the water sample itself provides the asymptotic detection medium, are set forth in Table 1. In this table, $\lambda$ is the fission track density in tracks per square centimeter, $\tau_{th}$ is the thermal neutron flux in units of neutrons per square centimeter per second used in irradiating the SSTR, T is the duration of the irradiation, and $f_a$ is the atom fraction of fissile nuclide in the water sample. These estimates are conservative since neutron fluences, that is $\tau*T$, can readily be achieved that are orders of magnitude greater than those shown.

TABLE 1

| Estimated Track Densities for MPC Levels in Water[a] | | | |
|---|---|---|---|
| | Actinide Isotope | | |
| Parameter | Natural Actinide | U-235 | PU-239 |
| MPC (curies/cm$^3$) | 3 E − 11 | 3 E − 11 | 5 E − 12 |
| $\sigma_{th}$cm$^2$ | 577 E − 24 | 577 E − 24 | 714 E − 24 |
| $f_a$ | 8.09 E − 09[b] | 3.55 E − 07 | 2.03 E − 12 |
| $\lambda$ (tracks/cm$^2$) | 3.4 E + 06 | 1.5 E + 08 | 1.0 E + 03 |

TABLE 1-continued

| Estimated Track Densities for MPC Levels in Water[a] | | | |
|---|---|---|---|
| | Actinide Isotope | | |
| Parameter | Natural Actinide | U-235 | PU-239 |
| Number of Decays[c] | 8.0 | 8.0 | 1.3 |

[a]Assumptions for the neutron irradiation are: $\tau = 2 \times 10^{12}$ neutrons/(cm$^2$/sec) and T = 3600 sec (1 hour).
[b]Contribution from U-235 at a presence of 0.72 weight percent in natural uranium.
[c]Number of alpha particle decays in one hour in an asymptotic volume of 1 cm$^2$ * 20 $\mu$m = 2.0 E − 03 cm$^3$.

There is some difficulty in comparing our fission track process with other nuclear metrology methods having the same purpose, as the intrinsic elements and factors comprising the different methods vary widely, making direct comparisons impossible without introducing assumptions. Commonly, MPC levels are expressed in curies/gram or curies/cm$^3$ of water, which for an unknown mixture of actinides is 3E-14 curies/cm$^3$ under current standards. The sensitivity of our fission track process, however, is not based on the decay rate of the actinides present, but rather on the atom density of those actinides, so track density based on these comparison values cannot be calculated, since the specific activity (decay rate/gram) of the unknown mixture is not known and one cannot therefore calculate atom density of the unknown actinide mixture in water.

To compare our method, we must first establish a base line for the concentration of naturally occurring actinides and then use an increase above this level as observed by our process to predict actinide pollution. To do this, our process is applied to water samples containing only naturally occurring actinide impurities that are indigenous to the test environment. Making the necessary assumptions to convert the base line value of our process to that of decay standards, we find that the MPC value of 2E-12 curies/cm$^3$ yields the track density of 2.3E+05 tracks/cm$^3$ for baseline environmental water samples. This makes our process of substantially greater sensitivity than other nuclear metrology methods and provides orders of magnitude in response for the observation of an early warning signal from actinide pollution.

Our invention differs from the known art not in any one of these features per se, but rather in the synergistic combination of all of them to provide the structures, functions and processes hereinafter specified and claimed.

SUMMARY OF INVENTION

Our invention provides a process for accurately determining actinide pollution in water by solid state track recorder (SSTR) metrology using water samples as asymptotic fission sources.

A particular relatively small sample cell carries an SSTR, provides means for continuous sample collection and containment during the entire assay process, and provides appropriate configuration to constitute the water sample contained in the sample cell as an asymptotic fission source. Relief means are provided in the sample cell to relieve pressures generated by water radiolysis during sample radiation.

Our process comprises the steps of:

1) determining a base line background actinide level by processing uncontaminated samples from the environment in question, by theoretical computational determination, or by processing standard samples of known constituency;

2) capturing sufficient volumes of fluidic samples within sample cells of our invention, each containing an SSTR, to constitute the fluidic sample as an asymptotic fission source for the associated SSTR;

3) irradiating a plurality of the sample cells of step 2) in a known thermal neutron flux for a predetermined time;

4) removing the SSTRs from the irradiated sample cells and processing to determine fission track density therein;

5) comparing the measured fission track densities of SSTRs with the standard fission track density determined under step 1) to determine fissile actinide pollution in the water sample associated with a measured sample SSTR.

In creating such apparatus and process, it is:

A principal object of our invention to provide a new and novel process to accurately measure low level fissile actinide contamination of water samples by SSTR metrology.

A further object of our invention to provide such a SSTR metrology process that uses the fluidic sample itself as an asymptotic fission source.

A further object of our invention to provide such a process that is of simple nature, provides rapid measurements and is more economical than qualitative assay methods heretofore known for similar purposes.

A further object of our invention to provide such a process that has substantial sensitivity, well below maximum permissible concentrations (MPCs) of actinides being dealt with, to allow early determination of actinide contamination to provide maximum time to deal with problems causing such contamination.

A still further object of our invention to provide a sample cell for use in such process that is of small volume and provides means for sample collection and continuous encapsulation during processing to eliminate potential contamination from naturally occurring actinides during the measurement process.

A still further object of our invention to provide such a sample cell that has means for relief of gas pressure generated by a fluidic sample by radiolysis during thermal neutron irradiation.

A still further object of our invention to provide such apparatus and process that are of new and novel design, of rugged and durable nature, of simple and economic manufacture and use and otherwise well suited to the uses and purposes for which they are intended.

Other and further objects of our invention will appear from the following specification and accompanying drawings which form a part hereof. In carrying out the objects of our invention, however, it is to be understood that its essential features are susceptible of change in design and arrangement with only one preferred and practical embodiment of the best known form of our invention being illustrated and specified as is required.

BRIEF DESCRIPTION OF DRAWINGS

In the accompanying drawings which form a part hereof and wherein like numbers of reference refer to similar parts throughout:

FIG. 1 is an isometric surface view of a typical sample cell of our invention.

FIG. 2 is a medial vertical cross-sectional view through a sample cell, such as taken on line 2—2 of FIG. 1 in the direction indicated by the arrows thereon, showing an SSTR detector suspended in a medial position within a sample cell chamber.

FIG. 3 is a cross-sectional view through a sample cell, such as taken on line 2—2 of FIG. 1 in the direction indicated by the arrows thereon, showing a species of sample cell having a SSTR on its bottom and being only partially filled with a fluidic sample to provide space in the sample cell chamber for gas generated during irradiation.

FIG. 4 is a partially cut-away, isometric view of a typical uniform flux assembly wherein a plurality of sample cells may be simultaneously irradiated by a thermal neutron flux.

DESCRIPTION OF PREFERRED EMBODIMENT

Sample Cell

Sample cell 10 as seen in FIG. 2 provides a peripherally defined cylindrical body comprising vertical side 11 and structurally interconnected bottom 12 to define medial sample chamber 13 for containment of fluidic sample 27. The upper inner portion of vertical side 11 defines annular gasket groove 18 to carry annular sealing ring 19 in a sealing relationship. Top 15 is configured to releasably seal upon the upper portion of the sample cell with lower surface 15a of the top 15 fitting adjacent the upper portion of sealing ring 19 to form a seal between the top and the body portion of the sample cell. Fastening skirt 16 extends downwardly from the periphery of top 15 to define internal threads 17 configured to matingly engage threads 14 of the body to allow releasable and adjustable threaded fastening of the top portion of the cell to the body portion.

Input channel 20 and output channel 22 communicate respectively through shutoff valves 21, 23 and through top 14 to extend into sample chamber 13 to allow input of fluidic samples into the sample chamber. A fluid pump (not shown) may be associated with either channel, but preferably with the vacuum outlet channel 22 to aid in moving a fluidic sample through channel 20 and into chamber 13 of the sample cell without potential contamination by the pump.

A solid state track recorder (SSTR) is carried within sample chamber 13. In the instance illustrated in FIG. 2, the SSTR comprises a plate-like device carried by support rod 24 which structurally depends from the medial part of inner surface 15a of top 15 to position the SSTR in the medial portion of the sample chamber. In the form of sample cell illustrated in FIG. 3, the SSTR is maintained on the upper surface of the bottom of the sample cell, which in this instance is only partially filled with fluidic sample 27.

It is necessary that the sample cell provide an asymptotic fluidic configuration for a SSTR detector and this can be accomplished by various methods. Two of such methods are shown: the first, shown in FIG. 2, by suspending the SSTR in a medial position in the sample chamber and the second, shown in FIG. 3, by using the SSTR as a partial liner at the bottom of the sample chamber. Alternatively, the SSTR could be used as a liner on the inside of the cylindrical body of the cell and in fact, the entire cell body could be fabricated from SSTR material, such as glass, so that the interior surface of the cell could in either instance provide the desired asymptotic water configuration.

With any SSTR configuration, fluid sample 27 should cover the SSTR area of interest by a layer greater than the fission fragment range (R) of water which is known to be of approximately R = 20 μm. At the same time, the cell's geometry must afford the SSTR area of interest an unobstructed view of the asymptotic water volume to maintain the efficiency corresponding to the asymptotic sensitivity of water, that is approximately $10^{20}$ atoms/cm$^2$, and eliminate any contribution of fission track background from actinide impurities within the structural components of the cell.

Since no intermediate steps are required to process the sample after its collection, the only sources of fission track background are:

a) any actinide residue that remains from cleaning the cell and the SSTR,
b) actinide impurities in the SSTR itself,
c) leaching of any actinide impurities from the cell components into a water sample.

To deal with problem a), great care must be exercised in the type and purity of reagents used to clean both the cell and the SSTR. To deal with the other problems SSTRs should be chosen that have the lowest possible actinide impurity levels. Known SSTRs using Lexan and some selected types of mica and natural quartz crystals provide such lowest possible impurity levels. Similarly, the cell components should be fabricated from materials not only having low actinide impurity levels but also having low leach rates. Fortunately, the fission track method itself can be used to study these potential contamination problems and can be used to introduce improvements to attain fission track background of an acceptable level, as hereinafter described.

For environmental monitoring it is advantageous to simultaneously irradiate a plurality of sample cells in the same uniform thermal neutron fluence. Since only limited irradiation volume exists in reactors for such purpose, the smaller the size of a sample cell that may be used, the larger will be the number of such sample cells that may be simultaneously irradiated. By reason of this, we prefer that our sample cells be approximately three-quarter inch (1.9 cm) in diameter and approximately the same height. Such smaller cell size is also beneficial because of the concomitant lower radioactivity produced by neutron radiation of the cell. This lowers any personnel exposure that might arise in post irradiation handling of cells. To further this end, the cells should be fabricated of materials that possess the lowest neutron activation cross-sections, which generally requires that metals not be used and that metallic impurities be kept to a minimum.

Sample irradiation subsequent to collection causes a decomposition of the sample water by exposure to a thermal neutron radiation field. This radiolytic disassociation, or radiolysis, disassociates some hydrogen and oxygen and causes the elemental gases to be liberated. Since our sample cells are closed, gas pressures will increase to a steady state equilibrium value unless some venting is provided. The magnitude of this pressure depends largely on the radiation field intensity and the concentration of impurities, as well as the type of the impurities, in the water. Typical parameters will raise pressures in sample cells approximately one atmosphere above atmospheric pressure. Because of this, it is advantageous to incorporate some pressure relief mechanism in our sampling cells to ensure integrity.

A simple method of pressure relief is to provide a permeable membrane in one of the sampling channels (not shown) through which gases may diffuse. Generally, materials such as natural rubber, cellulose nitrate and Cell Guard that heretofore have been used as diffusion barriers in radon measurements possess short enough delay times to be applicable. With such a venting system, the sample chamber remains sealed to most substances to prevent external contamination.

Another simple method of dealing with such gas pressure is to use a relatively small volume of water in the sample chamber, as the water volume need be only approximately 20 μm in thickness to serve as an asympotic fission source. Such a cell is shown in FIG. 3, with its input and output channels 20a, 22a both extending downwardly into sample chamber 13 to a level where a fluidic sample level is to be established. When water is introduced into this sample cell, air will be trapped above the level of the input and output channels when the channel tubes are orientated as shown in FIG. 3. If by accident the fluid level rises thereabove, the output valve may be opened to allow the fluidic level to be lowered to the lower ends of the capillary tubes. Since the axial length of a sample cell can be greater than its diameter, the volume of air space can be substantially greater than the volume of water in the cell, and this will tend to limit gas pressure from radiolysis, as the amount of gas generated will be proportional to the amount of water exposed to radiation. This keeps equilibrium gas pressure attained in sample cells low enough that cell integrity is assured.

Radiation Procedures

It is necessary to irradiate the fluidic fission source with thermal neutrons to produce fission tracks that can be recorded and measured in the SSTR according to the known technology. The irradiation is carried out in a known uniform flux assembly, such as shown somewhat diagramatically in FIG. 4. This particular uniform flux irradiator 28 provides graphite reflector 29 supporting in immediate adjacency rotating plate 31 which carries sample cell holder 32 and is driven by motor drive assembly 33. Radiation is provided by a thermal source reactor through window 30 to provide a substantially uniform thermal neutron fluence over the samples to be irradiate. This particular device is typified by the Argonne Thermal Source Reactor.

For environmental monitoring, it is advantageous to simultaneously irradiate a plurality of samples in a uniform flux. The particular device illustrated may handle approximately fifty sample cells at one time by providing a twelve inch rotating plate for use with sample cells of approximately three-quarter inch (1.9 cm) external diameter, and it is possible to extend the design to operate with an even greater number of sample cells.

Three different procedures can be employed for such irradiation of environmental water samples.

The first neutron irradiating procedure employs a uniform flux assembly in a manner similar to the original asymptotic sensitivity measurements with uranium metal. The fission track density λ obtained in a given neutron irradiation can be estimated from the relationship $$\lambda = \tau_{th} \cdot T \cdot \sigma_{th} \cdot a_\infty \cdot f_a, \tag{1}$$

where the $a_\infty$ is the asymptotic sensitivity of water. Solving equation (1) for the atom fraction $f_a$, one has $$f_a = \lambda_\infty / (\tau_{th} \cdot T \cdot \sigma_{th} \cdot a_\infty). \tag{2}$$

where $\lambda_\infty$ signifies the track density observed in the asymptotic water configuration of our sample cell. Consequently $f_a$ can be determined by measuring the track density $\lambda_\infty$, provided one knows the factors in the denominator of equation (2). These factors can be determined as follows:

a) the thermal neutron flux $\tau_{th}$ can be determined using conventional neutron dosimetry methods;

b) the time duration T can be measured by using available monitoring of the reactor power time history for the irradiation. Many power monitoring charts relating to reactor control are available for this purpose;

c) the value of the thermal neutron fission cross-section $\sigma_{th}$ can be found in the extensive nuclear literature data that exists for neutron cross-sections;

d) the asymptotic sensitivity of water $a_\infty$ can be measured by following the procedures originally used to determine the asymptotic sensitivity of uranium metal.

Since all of these factors arise in neutron dosimetry, it can be seen that the first procedure is closely related to the original asymptotic sensitivity measurements which were carried out for neutron dosimetry applications.

In the second procedure, at least one SSTR neutron dosimeter using an accurately quantified actinide fission deposit is irradiated in the uniform flux assembly. The mass density $d_a$ (atoms/cm$^2$) of this actinide deposit must be accurately known and should be small, so that fission fragment self-absorption within the thickness of the deposit is negligible. The track density for the SSTR neutron dosimeter $\lambda_d$ is given by $$\lambda_d = \tau_{th} \cdot T \cdot \sigma_{th} \cdot d_a. \qquad (3)$$

whereas the track density attained in the asymptotic water configuration of one of our sample cells is given as before by $$\lambda_\infty = \tau_{th} \cdot T \cdot \sigma_{th} \cdot a_\infty \cdot f_a. \qquad (4)$$

Dividing equation (4) by equation (3) and solving for $f_a$, one finds $$f_a = (d_a/a_\infty) \cdot (\lambda_\infty/\lambda_d). \qquad (5)$$

Hence the atom fraction is determined by the ratio of the measured track densities $\lambda_\infty/\lambda_d$ in terms of the known ratio of atom densities $d_a/a_\infty$. Here the atom fraction is the equivalent atom fraction of the actinide deposit. In other words, if the deposit were natural uranium, the atom fraction $f_a$ given by equation (5) is the equivalent natural uranium atom fraction, that is the atom fraction that would exist in the water sample if only natural uranium were present. This second procedure has the advantage over the first procedure in that three neutron dosimetry factors, namely $\tau_{th}$, T and $\sigma_{th}$ need no longer be determined beyond measuring the track densities $\lambda_d$ and $\lambda_\infty$. It only is necessary to know the actinide deposit mass density $d_a$ and the asymptotic sensitivity of water $a_\infty$.

The third procedure is even simpler as it eliminates the need to determine the asymptotic sensitivity of water $a_\infty$. To use this third procedure, water solutions of known actinide concentration are prepared. Actinide solution concentrations can be accurately prepared by dissolving a known mass of an actinide, such as natural uranium, in a known volume of water and very low concentration levels can be achieved by accurate dilution with water to provide standard solutions of accurately known atom fraction $f_s$.

Samples from the standard solution are acquired in sample cells using the same procedure as described for taking environmental water samples. In neutron irradiation, at least one of the sample cells of a batch contains the standard solution. Under these conditions, equation (4) still represents the track density attained in the environmental water samples. The track density attained in the standard solution $\lambda_s$ can be written as $$\lambda_s = \tau_{th} \cdot T \cdot \sigma_{th} \cdot a_\infty \cdot f_s \qquad (6)$$

Dividing equation (4) by equation (6) and solving for $f_a$ one has $$f_a = f_s \cdot (\lambda_\infty/\lambda_s). \qquad (7)$$

Thus in the third procedure, the sought atom fraction $f_s$ is simply the standard atom fraction $f_s$ multiplied by the ratio of the observed track densities ($\lambda_\infty/\lambda_s$). Just as in the second procedure, this third procedure provides an equivalent atom fraction, that is the atom fraction $f_a$ in equation (7) is the equivalent atom fraction in the environmental water sample of those actinides that comprise the standard solution. The advantage of the third procedure is that all neutron dosimetry factors are eliminated.

Although accuracy is not a particularly significant requisite for an early warning system, it is to be noted that the accuracy of the third procedure is limited essentially by the uncertainty of $f_s$. Because of the high sensitivity of the fission track process, the track densities $\lambda_\infty$ and $\lambda_s$ are so large that they can be measured, in principle, to high statistical precision. As a consequence, the accuracy of the third procedure depends chiefly on how accurately the standard solution can be prepared. There also is less likelihood that systematic uncertainties will arise in the third procedure, since the standard solution samples use the same sampling procedure, the same sample cell and the same uniform flux assembly neutron irradiation. In addition, track densities $\lambda_\infty$ and $\lambda_s$ both arise from an asymptotic water configuration in the same SSTR material and the same scanning procedures can be used for measuring all track densities.

After the obtaining of samples and their irradiation as described, it remains necessary only to remove the SSTRs from the sample cells and then to process and count the fission tracks in the SSTRs by traditional methods. Comparison with standards herein before described determines the actinide pollution. The methods of scanning and processing SSTRs have been well documented in both general scientific and patent literature.

It should be particularly noted that although our process has been described for use principally in determining actinide pollution in environmental water samples, the process may also be used to detect pollution in light or heavy water reactors where fuel elements may leak because of imperfections in manufacture or radiation induced damage or corrosion. In these applications, it is similarly critical that the leaking fuel elements be identified and replaced as soon as possible prior to any release of radioactivity and fuel into the water moderator of the reactor. Our process is of the highest sensitivity to furnish the earliest possible warning of such events and is well suited to this task. Our process also is well suited to detect a leaking fuel assembly in a spent fuel storage facility.

The foregoing description of our invention is necessarily of a detailed nature so that a specific embodiment of it may be set forth as required, but it is to be understood that various modifications of detail, rearrangement of elements and multiplication of parts may be resorted to without departing from its spirit, essence or scope.

Having thusly described our invention, what we desire to protect by Letters Patent, and what we claim is:

1. A process for measuring small amounts, of actinide pollution in fluidic samples by use of solid state track recording devices, comprising the steps of:

containing a sample to be tested, containing small amounts of less than 3E-12 Curies per cubic centimeter of actinide pollution, in a sample cell defining an internal chamber and having means for ingress and egress and means for establishing a fluidic sample therein, said sample cell being substantially transparent to thermal neutron radiation and the internal chamber defined therein being configured to constitute a fluidic sample therein as an asymptotic fluid fission source;

positioning a solid state track recorder within the internal chamber defined by the sample cell, so that the solid state track recorder has a radiation viewing window through an asymptotic thickness of a fluidic sample contained in the sample cell;

capturing at least an asymptotic amount of fluidic sample in the sample cell;

irradiating the sample cell and contained fluidic sample and solid state track recorder in a thermal neutron flux of at least $2 \times 10$ exponent 13 neutrons per square centimeter per second to cause fission in the fluidic sample to create tracks in the solid state track recorder carried within the sample cell; and removing the solid state track recorder from the sample cell and measuring tracks recorded therein to determine actinide content of the associated fluidic sample.

2. The process of claim 1 wherein the sample cell has a major dimension of not more than approximately 0.75 inch to allow simultaneous irradiation of a plurality of sample cells at one time in the same thermal neutron fluence.

3. The process of claim 1 further characterized by the sample cell supporting a solid state track recorder in a medial portion of the internal chamber defined in the sample cell, with an asymptotic thickness of fluidic sample greater than approximately 20 $\mu$m about at least one viewing surface of the solid state track recorder.

4. The process of claim 1 wherein the sample cell has means to relieve gas pressures caused in the internal chamber thereof by radiolytic disassociation of a fluidic sample therein.

5. The process of claim 1 wherein the sample cell is of cylindrical configuration with an axial length not less than its diameter and the means of introducing a fluidic sample in the sample cell comprised of input and output channels defined to a spaced distance below the top of the sample cell so that an input fluidic sample will not extend above the elevation of the output orifice, to entrap air in the sample chamber above the fluidic sample to prevent pressure buildups in the sample chamber caused by radiolysis that are destructive of the sample cell.

6. The process of claim 1 further characterized by irradiating a set of plural sample cells in a single thermal neutron fluence so that all sample cells of the set are irradiated in substantially the same fashion.

7. The process of claim 6 further characterized by at least one of the sample cells of a given set incorporating a known concentration of actinides to allow comparison thereof with other samples of the set to determine actinide content of said other samples.

* * * * *